United States Patent
Sapper

(10) Patent No.: US 7,109,262 B2
(45) Date of Patent: Sep. 19, 2006

(54) EFFECT-PRODUCING, AQUEOUS COATING MATERIAL, METHOD FOR THE PRODUCTION AND USE THEREOF

(75) Inventor: Ekkehard Sapper, Rimpar (DE)

(73) Assignee: BASF Coatings AG, Munster (DE)

( * ) Notice: Subject to any disclaimer, the term of this patent is extended or adjusted under 35 U.S.C. 154(b) by 188 days.

(21) Appl. No.: 10/490,931

(22) PCT Filed: Oct. 21, 2002

(86) PCT No.: PCT/EP02/11753

§ 371 (c)(1),
(2), (4) Date: Mar. 26, 2004

(87) PCT Pub. No.: WO03/038004

PCT Pub. Date: May 8, 2003

(65) Prior Publication Data

US 2005/0004265 A1   Jan. 6, 2005

(30) Foreign Application Priority Data

Nov. 2, 2001   (DE)   ................................. 101 54 030

(51) Int. Cl.
C08K 5/1515   (2006.01)
C08K 5/15   (2006.01)

(52) U.S. Cl. ...................... 524/114; 524/107; 524/458; 524/588; 522/84; 522/90; 522/104; 522/100; 522/148; 522/151; 522/91; 522/172

(58) Field of Classification Search .................. 522/84, 522/90, 104, 100, 148, 151, 91, 172; 524/114, 524/107, 588, 458
See application file for complete search history.

(56) References Cited

U.S. PATENT DOCUMENTS

| | | | |
|---|---|---|---|
| 4,479,824 A | 10/1984 | Schutt | |
| 4,860,754 A | 8/1989 | Sharik et al. | |
| 5,100,955 A | 3/1992 | Pons et al. | |
| 5,599,597 A | 2/1997 | Berg et al. | |
| 5,686,523 A * | 11/1997 | Chen et al. | 524/547 |
| 5,714,532 A * | 2/1998 | Osterholtz et al. | 524/114 |
| 6,127,462 A * | 10/2000 | Chen et al. | 524/114 |
| 6,221,938 B1 * | 4/2001 | Chen et al. | 524/114 |
| 6,270,884 B1 | 8/2001 | Gunde et al. | |
| 6,369,139 B1 * | 4/2002 | Osterholtz et al. | 524/114 |
| 6,620,514 B1 | 9/2003 | Arpac et al. | |
| 6,632,897 B1 | 10/2003 | Geiter et al. | |

FOREIGN PATENT DOCUMENTS

| | | |
|---|---|---|
| CN | 1272424 | 11/2000 |
| DE | 3828098 | 3/1990 |
| DE | 19910876 | 10/2000 |
| EP | 401496 | 4/1990 |
| EP | 450625 | 4/1991 |

OTHER PUBLICATIONS

English Abstract for DE19910876 from EPO, Oct. 5, 2000.
English Abstract for DE3828098 from EPO, Mar. 8, 1990.
English Abstract for EP401496 from EPO, Dec. 13, 1990.
English Abstract for EP450625 from EPO, Oct. 9, 1991.
English Abstract for JP03064305 from EPO, Mar. 19, 1991.
English Abstract for CN1272424 from EPO, Nov. 8, 2000.
English Abstract for JP06158492 from EPO, Jun. 7, 1994.
English Abstract for JP05303238 from EPO, Nov. 16, 1993.
Machine Translation of JP06158492 from JPO, Jun. 7, 1994.
Machine Translation of JP05303238 from JPO, Nov. 16, 1993.

* cited by examiner

Primary Examiner—Sanza L. McClendon

(57) ABSTRACT

An aqueous effect coating material, comprising
(A) at least one water-soluble, -dilutable and/or -dispersible binder,
(B) at least one effect pigment, and
(C) at least one silicon compound of the general formula I $$[(E)_n L]Si(R^1)(R^2)(R^3) \qquad (I)$$

in which the index and the variables are defined as follows:

n is an integer from 1 to 5;
E is a reactive functional group;
L is an at least divalent, linking, organic group;
$R^1$ is a substituted or unsubstituted cycloalkoxy, alkoxy, aryloxy, cycloalkyl, alkyl or aryl radical; and
$R^2$ and $R^3$ independently of one another are substituted or unsubstituted cycloalkoxy, alkoxy or aryloxy radicals or hydroxyl groups;

preparation process, and its use.

25 Claims, No Drawings

EFFECT-PRODUCING, AQUEOUS COATING MATERIAL, METHOD FOR THE PRODUCTION AND USE THEREOF

CROSS REFERENCE TO RELATED APPLICATIONS

This application is a National Phase Application of Patent Application PCT/EP02/11753 filed on 21 Oct. 2002, which claims priority to DE 101 54 030.2, filed on 2 Nov. 2001.

The present invention relates to a novel aqueous effect coating material. The present invention also relates to a novel process for preparing an aqueous effect coating material. The present invention additionally relates to the use of the novel aqueous effect coating material to produce one-coat and multicoat effect paint systems.

In aqueous coating materials, especially aqueous basecoat materials, particular optical effects are produced using, alongside the color pigments, effect pigments which at different viewing angles exude a different color effect or a color flop or a change between light and dark on account of their geometry, their shape, their coating, their anisotropy, their multilayer construction, etc. These effect pigments are generally mica pigments, optically variable interference pigments or metallic pigments. The stability of these effect pigments in an aqueous medium is limited. Aluminum effect pigments in particular break down fairly rapidly to form hydrogen and aluminum hydroxide. The mica pigments as well often prove to be inadequate in their stability to moisture, a lack of stability which is manifested by bubbles in the coating that are induced by the decomposition products.

In order to eliminate these disadvantages, pigment manufacturers protect the surface of the effect pigments by phosphating, chromating or silanizing, although this makes the effect pigments significantly more expensive. For the preparation of coating materials, therefore, it would be highly desirable if the untreated effect pigments could be used, as they are in conventional effect coating materials, including conventional basecoat materials, for example.

The effect coatings produced from the aqueous coating materials, particularly aqueous basecoat materials, are required to be of particularly high quality especially in the field of automotive finishing. Accordingly, the coatings are to be colorfast and stable to weathering. They are to be insensitive to moisture and must not, for example, develop water spots. They are to exhibit good intercoat adhesion within the multicoat effect paint systems, in the context both of the original finish and of any refinish. Furthermore, they are to have a high mechanical stability, particularly with regard to stone chipping. This profile of properties is provided above all by the binders and crosslinking agents in the aqueous coating materials.

In this context it would be especially advantageous if the aqueous coating materials contained constituents which combined the functions of the crosslinking agent and those of the effect pigment stabilizer.

Silanes containing reactive functional groups and hydrolyzable groups such as alkoxy groups have been known for a long time and are available commercially.

They are used, for example, to modify aqueous dispersions of methacrylate copolymers containing acid groups. For instance, the addition of a small amount of 3-(2-aminomethyl)aminopropyltriethoxysilane results in a significant increase in bond strength (cf. the Japanese patent application J0 3064-305-A).

3-Glycidyloxypropyltrimethoxysilane or 3-glycidyloxypropyldimethoxysilane may be used as a crosslinking agent in aqueous coating materials which comprise ethylene copolymers, chlorinated polypropylene, and wax and have been modified with maleic anhydride.

The European patent application EP 0 401 416 B1 discloses aqueous methacrylate copolymer dispersions which are modified with 3-glycidyloxypropyl-trimethoxysilane. They are used to produce cement-free adhesive compounds for tiles.

The American patent U.S. Pat. No. 5,100,955 A discloses an aqueous dispersion comprising a styrene-methacrylate copolymer, containing acid groups, and a silane, such as 3-glycidyloxypropyltrimethoxysilane. The aqueous dispersion is likewise used to produce cement-free adhesive compounds for tiles.

The Canadian patent application CA 2093606 A1 discloses cement injection molding compounds which produce, for example, drainage pipes having improved acid resistance. The improved acid resistance is obtained by additions of aqueous styrene-methacrylate copolymer dispersions which contain acid groups which may be modified with epoxy silanes.

The simultaneous as use of the known silanes as crosslinking agents and as stabilizers for effect pigments in aqueous effect coating materials is not evident from the prior art.

It is an object of the present invention to provide a novel aqueous effect coating material which no longer has the disadvantages of the prior art but which instead is easy to prepare, is stable on storage, and provides effect coatings which have a high crosslinking density, high elasticity, good mechanical strength, very good wet adhesion properties, a very low moisture sensitivity, preventing the formation of water spots, a very good intercoat adhesion, and very high gasing stability. Moreover, the novel effect coatings are to be especially compatible with clearcoat systems produced from clearcoat slurries, so that no mud cracking or other surface defects occur.

The invention accordingly provides the novel aqueous effect coating material, comprising
(A) at least one water-soluble, -dilutable and/or -dispersible binder,
(B) at least one effect pigment, and
(C) at least one silicon compound of the general formula I $$[(E)_nL]Si(R^1)(R^2)(R^3) \qquad (I)$$

in which the index and the variables are defined as follows:

n is an integer from 1 to 5;
E is a reactive functional group;
L is an at least divalent, linking, organic group;
$R^1$ is a substituted or unsubstituted cycloalkoxy, alkoxy, aryloxy, cycloalkyl, alkyl or aryl radical; and
$R^2$
and $R^3$ independently of one another are substituted or unsubstituted cycloalkoxy, alkoxy or aryloxy radicals or hydroxyl groups.

In the text below, the novel aqueous effect coating material is referred to as the "coating material of the invention".

The invention further provides the novel process for preparing the coating material of the invention, which comprises
(1) dispersing at least one effect pigment (B) together with at least one silicon compound (C) and then
(2) adding the aqueous dispersion of at least one binder (A), and (3) homogenizing the resulting mixture.

In the text below, the novel process for preparing the coating material of the invention is referred to as "process of the invention".

In the light of the prior art it was surprising and unforeseeable for the skilled worker that the object on which the present invention was based could be achieved by means of the coating material of the invention and the process of the invention. A particular surprise was that the silicon compounds (C) for use in accordance with the invention were able, in the aqueous medium of the coating material of the invention, to adopt both the function of a stabilizer for the effect pigments and the function of the crosslinking agent. Furthermore, it was surprising that the coating materials of the invention were stable on storage and produced effect coatings which had a high crosslinking density, high elasticity, good mechanical strength, very good wet adhesion properties, very low moisture sensitivity, preventing the formation of water spots, very good intercoat adhesion, and a very high gasing stability. Moreover, the novel effect coatings were especially compatible with clearcoat systems produced from clearcoat slurries, so that no mud cracking or other surface defects occurred.

The first essential constituent of the coating material of the invention is at least one water-soluble, -dilutable and/or -dispersible binder (A).

The binder (A) is preferably selected from the group consisting of ionically stabilized, ionically and nonionically stabilized, random, alternating and block, linear, branched and comb addition (co)polymers of ethylenically unsaturated monomers, polyaddition resins and/or polycondensation resins which are curable physically, thermally, with actinic radiation, and thermally and with actinic radiation. Regarding these terms, refer for further details to Römpp Lexikon Lacke und Druckfarben, Georg Thieme Verlag, Stuttgart, New York, 1998, page 457, "Polyaddition" and "Polyaddition resins (polyadducts)", and also pages 463 and 464, "Polycondensates", "Polycondensation" and "Polycondensation resins".

The binders (A) are preferably selected from the group consisting of (meth)acrylate (co)polymers, partially hydrolyzed polyvinyl esters, polyesters, alkyds, polylactones, polycarbonates, polyethers, epoxy resin-amine adducts, polyureas, polyamides, polyimides and polyurethanes, especially (meth)acrylate copolymers and polyurethanes.

With particular preference the polyurethanes (A) are selected from the group consisting of ionically or nonionically stabilized and also ionically and nonionically stabilized, especially anionically stabilized and anionically and nonionically stabilized, polyurethanes which are saturated, unsaturated and grafted with olefinically unsaturated compounds.

The polyurethanes (A) are known per se and are described, for example, in the German patent application DE 199 14 896 A1, column 1 lines 29 to 49, column 4 line 23 to column 11 line 5, and column 19 line 12 to column 20 line 6, the German patent application DE 44 38 504 A1, page 2 line 58 to page 4 line 40 in conjunction with page 5 line 24 to page 7 line 33, the German patent application DE 199 04 624 A1, page 2 line 35 to page 5 line 46 in conjunction with page 7 line 36 to page 8 line 14, the German patent application DE 41 07 136 A1, page 2 line 23 to page 4 line 35 in conjunction with page 5 lines 23 to 59, the German patent application DE 199 04 317 A1, page 9 line 44 to page 12 line 11 in conjunction with page 16 line 58 to page 17 line 2.

The (meth)acrylate copolymers (A) are also known per se and are described in detail, for example, in the German patent application DE 199 24 172 A1, page 3 line 33 to page 5 line 21, the German patent application DE 197 30 535 A1 or the international patent application WO 99/10439 A.

With particular preference the binders (A) are selected from the group consisting of (A1) (meth)acrylate copolymers containing in copolymerized form from 30 to 60% by weight of $C_1$–$C_8$ alkyl(meth)acrylates, from 30 to 60% by weight of vinylaromatic monomers, and from 0.5 to 10% by weight of (meth)acrylic acid, based in each case on the (meth)acrylate copolymer, and (A2) polyurethanes preparable by subjecting an ethylenically unsaturated monomer or a mixture of ethylenically unsaturated monomers to free-radical polymerization in an aqueous dispersion of a polyurethane resin having a number-average molecular weight Mn of from 1 000 to 30 000 daltons and containing on average per molecule from 0.05 to 1.1 polymerizable double bonds and in the presence of a water-insoluble initiator or of a mixture of water-insoluble initiators, the weight ratio between the polyurethane resin and the ethylenically unsaturated monomer or mixture of ethylenically unsaturated monomers being between 1:10 and 10:1.

The binders (A1) and (A2) are described in detail in the German patent application DE 197 30 535 A1 or in the international patent application WO 99/10439 A. They are used preferably in the form of aqueous dispersions.

Accordingly, the acrylate dispersion (A1) may be prepared by prior art methods. The proportion between the monomers and the water may be selected so that the resulting dispersion has a solids content of preferably from 30 to 60% by weight.

The acrylate dispersion (A1) is prepared preferably in the presence of an emulsifier. The emulsifier used is preferably an anionic emulsifier, alone or in a mixture with others. Examples of anionic emulsifiers are the alkali metal salts of sulfuric monoesters of alkylphenols or alcohols, the sulfuric monoesters of ethoxylated alkylphenols or ethoxylated alcohols, preferably the alkali metal salts of the sulfuric monoester of a nonylphenol reacted with from 4 to 5 mol of ethylene oxide per mole, of alkyl- or arylsulfonate, sodium lauryl sulfate, sodium lauryl ethoxylate sulfate, and secondary sodium alkanesulfonates whose carbon chain contains 8 to 20 carbon atoms. The amount of the anionic emulsifier is from 0.1 to 5.0% by weight, based on the monomers, preferably from 0.5 to 3.0% by weight. Additionally, in order to increase the stability of the acrylate dispersions (A1), it is possible to use a nonionic emulsifier of the type of an ethoxylated alkylphenol or fatty alcohol as well, e.g., an adduct of 1 mol of nonylphenol and from 4 to 30 mol of ethylene oxide, in a mixture with the anionic emulsifier.

The minimum film formation temperature (MFFT) of the (meth)acrylate copolymer (A1) is preferably between −30° C. and 60° C., with particular preference between 0° C. and 30° C.

The (meth)acrylate copolymer (A1) preferably has a number-average molecular weight Mn of from 200 000 to 2 000 000 daltons, preferably from 300 000 to 1 500 000 daltons (determined by gel permeation chromatography using polystyrene as standard).

The amount of the acrylate dispersion (A1) in the coating material of the invention may vary widely and is guided by the requirements of the case in hand. The amount is preferably from 1 to 30%, more preferably from 2 to 25%, with particular preference from 3 to 20%, and in particular from 4 to 15%, by weight, based in each case on the overall amount of the coating material of the invention.

The dispersion (A2) comprises an aqueous dispersion of a polymer obtainable, as described in the German patent application DE 43 39 870 A1, by subjecting an ethylenically unsaturated monomer or a mixture of ethylenically unsaturated monomers to free-radical polymerization in an aqueous dispersion of a polyurethane resin having a number-average molecular weight Mn of from 1 000 to 30 000 daltons and containing on average per molecule from 0.05 to 1.1 polymerizable double bonds and in the presence of a water-insoluble initiator or mixture of water-insoluble initiators, the weight ratio between the polyurethane resin and the ethylenically unsaturated monomer or mixture of ethylenically unsaturated monomers being between 1:10 and 10:1.

The aqueous dispersion in which the ethylenically unsaturated monomer or mixture of ethylenically unsaturated monomers is subjected to free-radical polymerization in the presence of a water-insoluble initiator or of a mixture of water-insoluble initiators is preparable, in accordance with the German patent application DE 43 39 870 A1, by using
(a) a polyester- and/or polyetherpolyol having a number-average molecular weight of from 400 to 5 000 daltons, or a mixture of such polyester- and/or polyetherpolyols, and
(b) a polyisocyanate or a mixture of polyisocyanates, together if desired with a monoisocyanate or a mixture of monoisocyanates, and
(c) a compound whose molecule contains at least one isocyanate-reactive group and at least one group capable of forming anions, or a mixture of such compounds, or
(d) a compound whose molecule contains at least one NCO-reactive group and at least one poly(oxyalkylene) group, or a mixture of such compounds, or
(e) a mixture of components (c) and (d), and
(f) if desired, a compound containing a polymerizable double bond and also at least one further NCO-reactive group, or a mixture of such compounds, and
(g) if desired, a hydroxyl- and/or amino-containing organic compound having a molecular weight of from 60 to 399 daltons, or a mixture of such compounds, to prepare a polyurethane resin having a number-average molecular weight Mn of from 1 000 to 30 000 daltons, preferably from 1 500 to 20 000 daltons, and containing on average from 0.05 to 1.1, preferably from 0.2 to 0.9, polymerizable double bond(s), and dispersing said resin in water.

The polyurethane resin may be prepared either without solvent or else in organic solvents.

The polyurethane resin may be prepared by simultaneously reacting all of the starting compounds. In many cases, however, it is appropriate to prepare the polyurethane resin in stages. Thus it is possible, for example, to use components (a) and (b) to prepare an isocyanato-containing prepolymer which is then reacted further with component (c) or (d) or (e). It is also possible to use components (a) and (b) and (c) or (d) or (e) and, if desired, (f) to prepare an isocyanato-containing prepolymer which can then be reacted with component (g) to give a polyurethane resin of relatively high molecular mass. The reaction with component (g) may be carried out without solvent or—as described, for example, in the European patent application EP 0 297 576 A1—in water. In cases where a compound containing only one isocyanate-reactive group is used as component (f), it is possible in a first stage to use (b) and (f) to prepare an isocyanato-containing precursor which can then be reacted further with the other components.

The reaction of components (a) to (g) may also be conducted in the presence of catalysts, such as dibutyltin dilaurate, dibutyltin maleate, and tertiary amines, for example.

The amounts of component (a), (b), (c), (d), (e), (f), and (g) that are to be used follow from the target number-average molecular weight Mn and from the target acid number. The polymerizable double bonds may be introduced into the polyurethane molecules by using components (a) containing polymerizable double bonds and/or components (b) containing polymerizable double bonds and/or component (f). It is preferred to introduce the polymerizable double bonds by way of component (f). It is also preferred to introduce acrylate, methacrylate or allyl ether groups, as groups containing polymerizable double bonds, into the polyurethane resin molecules.

As component (a) it is possible to use saturated and unsaturated polyester- and/or polyetherpolyols, especially polyester- and/or polyetherdiols having a number-average molecular weight of from 400 to 5 000 daltons. For details of components (a), refer to DE 43 39 870 A1.

As component (b) it is possible to use aliphatic and/or cycloaliphatic and/or aromatic polyisocyanates. Examples of aromatic polyisocyanates are phenylene diisocyanate, tolylene diisocyanate, xylylene diisocyanate, biphenylene diisocyanate, naphthylene diisocyanate and diphenylmethane diisocyanate. Owing to their good resistance to ultraviolet light, (cyclo)aliphatic polyisocyanates give rise to products having little tendency to yellow. For details of components (b), refer to the German patent application DE 43 39 870 A1 or DE 199 14 896 A1, column 4 line 26 to column 5 line 33.

In order to be able to disperse the polyurethane resin in question stably in water, it must contain hydrophilic groups. These hydrophilic groups are introduced into the polyurethane resin by component (c) and where appropriate component (d) or component (e).

Before or during the dispersion of the polyurethane resin in water, the groups of component (c) which are capable of forming anions are neutralized with a base, preferably ammonia or a tertiary amine, such as dimethylethanolamine, triethylamine, tripropylamine and tributylamine, for example, so that following the neutralization the polyurethane resin contains anionic groups. Where component (c) is the only component used that supplies hydrophilic groups, component (c) is used in an amount such that the polyurethane resin has an acid number of from 15 to 80 mg KOH/g, preferably from 20 to 60 mg KOH/g.

Where component (d) is also used as a component that supplies hydrophilic groups, component (d) is used in an amount such that the polyurethane resin contains from 5 to 40% by weight, preferably from 10 to 30% by weight, of oxyalkylene groups, any oxyalkylene groups that may be introduced by component (a) being included.

Moreover, a skilled worker can easily determine the amounts of component (c), (d) or (e) to be used by means of simple, routine tests. All he or she need do is use simple serial tests to examine how high the proportion of hydrophilic groups must at its least be in order to give a stable aqueous polyurethane resin dispersion. He or she can of course also use conventional dispersing assistants, such as emulsifiers, for example, in order to stabilize the polyurethane resin dispersions (A2). The use of dispersing assistants is, however, not preferred, since it generally raises the moisture sensitivity of the resulting coating materials of the invention.

As component (c) it is preferred to use compounds containing two isocyanate-reactive groups in the molecule. Suitable isocyanate-reactive groups are, in particular, hydroxyl groups, and also primary and/or secondary amino groups. Suitable groups capable of forming anions are carboxyl, sulfonic acid and/or phosphonic acid groups, with carboxyl groups being preferred. For details of components (c), refer to DE 43 39 870 A1.

With the aid of component (d), poly(oxyalkylene) groups may be introduced, as nonionic stabilizing groups, into the polyurethane molecules. Examples of compounds which can be used as component (d) include alkoxypoly(oxyalkylene) alcohols having the general formula R'O—(—CH$_2$—CHR"—O—)$_n$—H in which R' stands for an alkyl radical having from 1 to 6 carbon atoms, R" for a hydrogen atom or an alkyl radical having from 1 to 6 carbon atoms, and n for a number between 20 and 75.

Component (f) is used to introduce polymerizable double bonds into the polyurethane resin molecules. As component (f) it is preferred to use a compound containing at least one NCO-reactive group and one polymerizable double bond. Compounds used with particular preference as component (f) include a polymerizable double bond and also two more NCO-reactive groups. Examples of NCO-reactive groups include —OH, —SH, >NH, and —NH$_2$ groups, with —OH, >NH, and NH$_2$ groups being preferred.

Examples of compounds which may be used as component (f) include the following: hydroxy(meth)acrylates, particularly hydroxyalkyl(meth)acrylates such as hydroxyethyl, hydroxypropyl, hydroxybutyl or hydroxyhexyl(meth)acrylate and 2,3-dihydroxypropyl(meth)acrylate, 2,3-dihydroxypropyl monoallyl ether, glycerol mono(meth)acrylate, glycerol monoallyl ether, penta-erythritol mono(meth)acrylate, pentaerythritol di(meth)acrylate, pentaerythritol monoallyl ether, pentaerythritol diallyl ether, trimethylolpropane monoallyl ether, trimethylolpropane mono(meth)acrylate, and trimethylolpropane diallyl ether. As component (f) it is preferred to use glycerol mono(meth)acrylate, pentaerythritol di(meth)acrylate, pentaerythritol diallyl ether, and trimethylolpropane mono(meth)acrylate. As component (f) it is particularly preferred to use tri-methylolpropane monoallyl ether, glycerol monoallyl ether, and allyl 2,3-dihydroxypropanoate. It is preferred to incorporate the components (f) containing at least two NCO-reactive groups into the polyurethane molecules in chain-internal positions (not terminal positions).

As component (g) it is possible, for example, to use polyols having molar weights of between 60 and 399 daltons such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, ditrimethylolpropane ether, pentaerythritol, 1,2-cyclohexanediol, 1,4-cyclohexanedimethanol, bisphenol A, bisphenol F, neopentyl glycol, neopentyl glycol hydroxypivalate, hydroxyethylated or hydroxypropylated bisphenol A, hydrogenated bisphenol A, and mixtures thereof. The polyols are used generally in amounts of up to 30% by weight, preferably from 2 to 20% by weight, based on the amount of component (a) and (g) used.

As component (g) it is also possible to use diamines and/or polyamines containing primary and/or secondary amino groups. Polyamines are substantially alkylenepolyamines having molar weights of between 60 and 399 daltons. They may carry substituents containing no hydrogen atoms which are reactive with isocyanate groups. Examples are polyamines with a linear or branched aliphatic, cycloaliphatic or aromatic structure and at least two primary amino groups. Diamines include hydrazine, ethylenediamine, propylenediamine, 1,4-butylenediamine, piperazine, 1,4-cyclohexyldimethylamine, 1,6-hexamethylenediamine, trimethylhexamethylenediamine, menthanediamine, isophoronediamine, 4,4'-diaminodicyclohexylmethane and amino-ethylethanolamine. Preferred diamines are hydrazine, alkyl- or cycloalkyldiamines such as propylenediamines and 1-amino-3-aminomethyl-3,5,5-trimethylcyclohexane. It is also possible to use polyamines as component (g) which contain more than two amino groups in the molecule. In these cases, however, it should be ensured—by using monoamines as well, for example—that no crosslinked polyurethane resins are obtained. Polyamines of this kind which can be used include diethylenetriamine, triethylenetetramine, dipropylenetriamine, and dibutylenetriamine. An example of a monoamine is ethylhexylamine.

The binder present in the inventive component (A2) is obtainable by subjecting an ethylenically unsaturated monomer or a mixture of ethylenically unsaturated monomers to free-radical polymerization in the aqueous polyurethane resin dispersion described above and in the presence of a water-insoluble initiator or of a mixture of water-insoluble initiators, the weight ratio between the polyurethane resin and the ethylenically unsaturated monomer or mixture of ethylenically unsaturated monomers being between 1:10 and 10:1, preferably between 1:2 and 2:1.

Ethylenically unsaturated monomers which may be used include:

($\alpha$) aliphatic or cycloaliphatic esters of acrylic acid or methacrylic acid containing neither hydroxyl nor carboxyl groups, or a mixture of such esters, and ($\beta$) ethylenically unsaturated monomers which carry at least one hydroxyl group in the molecule, or a mixture of such monomers, and ($\gamma$) ethylenically unsaturated monomers which carry at least one carboxyl group in the molecule, or a mixture of such monomers, and ($\delta$) other, non-($\alpha$), -($\beta$), and -($\gamma$) ethylenically unsaturated monomers, or a mixture of such monomers, and ($\epsilon$) polyunsaturated monomers, especially ethylenically polyunsaturated monomers, and also mixtures of components ($\alpha$), ($\beta$), ($\gamma$), ($\delta$), and ($\epsilon$).

As ethylenically unsaturated monomers it is preferred to use mixtures comprising from 40 to 100% by weight, preferably from 60 to 90% by weight, of component ($\alpha$), from 0 to 30% by weight, preferably from 0 to 25% by weight, of component ($\beta$), from 0 to 10% by weight, preferably from 0 to 5% by weight, with very particular preference 0% by weight, of component ($\gamma$), and from 0 to 50% by weight, preferably from 0 to 30% by weight, of component ($\delta$), and also from 0 to 5% by weight, preferably 0% by weight, of component ($\epsilon$), the sum of the weight fractions of ($\alpha$), ($\beta$), ($\gamma$), ($\delta$), and ($\epsilon$) always being 100% by weight.

As component ($\alpha$) it is possible, for example, to use cyclohexyl acrylate, cyclohexyl methacrylate, alkyl acrylates and alkyl methacrylates having up to 20 carbon atoms in the alkyl radical, such as methyl, ethyl, propyl, butyl, hexyl, ethylhexyl, stearyl and lauryl acrylate and methacrylate, for example, or mixtures of these monomers.

As component (β) it is possible, for example, to use hydroxyalkyl esters of acrylic acid, methacrylic acid or another alpha,beta-ethylenically unsaturated carboxylic acid. These esters may derive from an alkylene glycol, which is esterified with the acid, or may be obtained by reacting the acid with an alkylene oxide. As component (β) it is preferred to use hydroxyalkyl esters of acrylic acid and methacrylic acid in which the hydroxyalkyl group contains up to 6 carbon atoms, or mixtures of these hydroxyalkyl esters. Examples in this respect may be found in DE 43 39 870 A1.

As component (γ) it is preferred to use acrylic acid and/or methacrylic acid. It is, however, also possible to use other ethylenically unsaturated acids having up to 6 carbon atoms in the molecule. Examples of such acids include ethacrylic acid, crotonic acid, maleic acid, fumaric acid, and itaconic acid.

As component (δ) it is possible, for example, to use vinylaromatic hydrocarbons, such as styrene, alpha-alkylstyrene, and vinyltoluene, acrylamide and methacrylamide, and acrylonitrile and methacrylonitrile, or mixtures of these monomers.

As components (ε) it is possible to use compounds containing at least two free-radically polymerizable double bonds in the molecule. Examples include the following: divinylbenzene, p-methyldivinylbenzene, o-nonyldivinylbenzene, ethanediol di(meth)acrylate, 1,4-butanediol di(meth)acrylate, 1,6-hexanediol di(meth)acrylate, trimethylolpropane tri(meth)acrylate, pentaerythritol di(meth)acrylate, allyl methacrylate, diallyl phthalate, butanediol divinyl ether, divinylethyleneurea, divinylpropyleneurea, diallyl maleate, and so on.

As water-insoluble initiators it is possible, for example, to use water-insoluble azo compounds and water-insoluble peroxy compounds. Examples of water-insoluble azo compounds include 2,2-azobis(isobutyronitrile), 2,2'-azobis(isovaleronitrile), 1,1'-azobis(cyclohexanecarbonitrile) and 2,2'-azobis(2,4-dimethylvaleronitrile). Examples of water-insoluble peroxy compounds include t-amyl peroxyethylhexanoate, t-butyl peroxyethylhexanoate, dilauryl peroxide, dibenzoyl peroxide, and 1,1-dimethyl-3-hydroxy-1-butyl peroxyethylhexanoate.

It is of course also possible to add polymerization regulators.

The polymerization of the ethylenically unsaturated monomer or mixture of ethylenically unsaturated monomers may be conducted by slowly adding the ethyl-enically unsaturated monomer or mixture of ethylenically unsaturated monomers to the aqueous polyurethane resin dispersion. It is possible either to add the entire amount of the monomers all at once or to introduce only a portion of them initially and to meter in the remainder in the course of the reaction. Alternatively, the monomers to be polymerized may be converted into a preemulsion using part of the polyurethane resin dispersion and water, and this preemulsion is then slowly added to the initial charge. The feed time of the monomers to be polymerized is generally from 2 to 8 hours, preferably from about 3 to 4 hours.

The water-insoluble initiators may be added to the initial charge or added dropwise together with the monomers. They may also be added in part to the initial charge, containing a portion of the monomers. The remainder of the initiator is then metered in together with the remaining monomers. The reaction temperature follows from the decomposition rate of the initiator or initiator mixture and may be lowered if desired by means of appropriate organic redox systems. The ethyl-enically unsaturated monomer or mixture of ethylenically unsaturated monomers is generally polymerized at a temperature of from 30 to 100° C., in particular at a temperature of from 60 to 95° C. If operating under superatmospheric pressure, the reaction temperatures may rise above 100° C.

The ethylenically unsaturated monomer or mixture of ethylenically unsaturated monomers is to be selected so that the binder polymers obtained in the manner described above have a hydroxyl number of from 0 to 100 mg KOH/g, preferably from 0 to 80 mg KOH/g, and an acid number of from 10 to 40 mg KOH/g, preferably from 15 to 30 mg KOH/g.

The solids content of the binder dispersion (A2) may vary widely and is guided by the requirements of the case in hand. The solids content is preferably from 20 to 80%, more preferably from 25 to 75%, with particular preference from 30 to 70%, and in particular from 35 to 65%, by weight, based in each case on the binder dispersion (A2).

The amount of the binder dispersion (A2) in the coating materials of the invention may also vary widely. It is preferably from 5 to 50%, more preferably from 7 to 35%, with particular preference from 10 to 30%, and in particular from 15 to 25%, by weight, based in each case on the overall amount of the coating material of the invention.

The further essential constituent of the coating material of the invention is at least one effect pigment (B). The effect pigments (B) are preferably selected from the group consisting of organic and inorganic, colored and achromatic, optical effect, electrically conductive, magnetically shielding and fluorescent pigments.

Examples of suitable optical effect pigments (B) are metal flake pigments, such as commercially customary aluminum bronzes, aluminum bronzes chromated in accordance with DE 36 36 183 A1, and commercially customary stainless steel bronzes, and also nonmetallic effect pigments, such as pearlescent pigments and interference pigments, for example, platelet-shaped effect pigments based on iron oxide with a color ranging from pink to brownish red, and liquid-crystalline effect pigments. For further details, refer to Römpp Lexikon Lacke und Druckfarben, Georg Thieme Verlag, 1998, page 176, "effect pigments" and pages 380 and 381, "metal oxide-mica pigments" to "metal pigments", and to the patent applications and patents DE36 36 156 A1, DE37 18 446 A1, DE37 19 804 A1, DE39 30 601 A1, EP 0 068 311 A1, EP 0 264 843 A1, EP 0 265 820 A1, EP 0 283 852 A1, EP 0 293 746 A1, EP 0 417 567 A1, U.S. Pat. No. 4,828,826 A, U.S. Pat. No. 5,244,649 A, EP 0 736 073 B1 or EP 0 736 076 B1.

Examples of fluorescent pigments (daylight-fluorescent pigments) are bis(azomethine) pigments.

Examples of suitable electrically conductive pigments are titanium dioxide/tin oxide pigments.

Examples of magnetically shielding pigments are pigments based on iron oxides or chromium dioxide.

The pigment concentration (B) of the coating materials of the invention may vary very widely and is guided primarily by the effect that is to be set and/or by the opacity of the color pigments. The pigment concentration is preferably situated at a total of from 3 to 65% by weight, based on the solids of the coating material of the invention.

The pigments (B) may be added to the coating material of the invention in any way desired, e.g., as an aqueous slurry or as a paste. Such pastes preferably include a dispersing binder, preferably a polyurethane-based binder, such as, for example, the polyurethane resins described in the German patent application DE 40 10 176 A1 or DE 41 07 136 A1, at least one of the rheological aids described below, deionized water, at least one organic solvent, and the pigment or a mixture of pigments. Where aluminum metallic pigments are used, they may be slurried in solvents and, possibly, in a mixture of water and wetting agent or may be dispersed in the main binder or in another, auxiliary binder.

With particular preference, however, the effect pigments (B) are dispersed, in accordance with the process of the invention, together with at least one silicon compound (C) that is to be used in accordance with the invention, in particular in at least one organic solvent, and then the aqueous dispersion of at least one binder (A) and, where appropriate, further customary and known constituents are added, and the resulting mixture is homogenized.

Examples of suitable organic solvents are alcohols such as methanol, ethanol, propanol, isopropanol, n-butanol, sec-butanol, tert-butanol, amyl alcohol, isoamyl alcohol, 1-hexanol, 1-heptanol, 1-octanol, 2-octanol, isooctanol, 1-nonanol, 1-decanol, 2-decanol, 1-undecanol, 1-dodecanol, 1-tridecanol, 2-tridecanol, ethyl glycol, ethyl diglycol, methyl glycol, methyl diglycol, propyl glycol, propyl diglycol, butyl glycol or butyl diglycol or diols such as ethylene glycol, diethylene glycol, propylene glycol, dipropylene glycol, the butylene glycols or dibutylene glycol, amides such as N-methylpyrrolidone or xylenes or mixtures of aromatic and/or aliphatic hydrocarbons such as Solventnaphtha®, petroleum spirit 135/180, dipentenes or Solvesso®.

The third essential constituent of the coating material of the invention is at least one, especially one, silicon compound (C) of the general formula I. In the general formula I the indices and variables have the following meanings:

n is an integer from 1 to 5, especially 1;

E is a reactive functional group;

L is an at least divalent, especially divalent, linking, organic group;

$R^1$ is a substituted or unsubstituted, especially unsubstituted, cycloalkoxy, alkoxy, aryloxy, cycloalkyl, alkyl or aryl radical; and $R^2$ and $R^3$ independently of one another are substituted or unsubstituted, especially unsubstituted, cycloalkoxy, alkoxy or aryloxy radicals or hydroxyl groups.

The groups E are preferably selected from the group consisting of (E1) reactive functional groups having at least one bond which can be activated with actinic radiation, and (E2) reactive functional groups which are able to undergo thermally initiated reactions with themselves or with corresponding reactive functional groups.

The bonds which can be activated with actinic radiation are preferably carbon-hydrogen single bonds or carbon-carbon, carbon-oxygen, carbon-nitrogen, carbon-phosphorus or carbon-silicon single bonds or double bonds, especially carbon-carbon double bonds ("double bonds").

The bonds which can be activated with actinic radiation may be attached to the linking group L via carbon-carbon bonds or ether, thioether, carboxylic ester, thiocarboxylic ester, carbonate, thiocarbonate, phosphoric ester, thiophosphoric ester, phosphonic ester, thiophosphonic ester, phosphite, thiophosphite, sulfonic ester, amide, amine, thioamide, phosphoramide, thiophosphoramide, phosphonamide, thiophosphonamide, sulfonamide, imide, urethane, hydrazide, urea, thiourea, carbonyl, thiocarbonyl, sulfone or sulfoxide groups, but in particular via carbon-carbon bonds, carboxylic ester groups, and ether groups.

The groups (E1) containing double bonds are preferably selected from the group consisting of (meth)acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl ether, norbornenyl ether, isoprenyl ether, isopropenyl ether, allyl ether or butenyl ether groups; or dicyclopentadienyl ester, norbornenyl ester, isoprenyl ester, isopropenyl ester, allyl ester or butenyl ester groups, especially methacrylate and acrylate groups.

The reactive functional groups (E2) are preferably selected from the group consisting of hydroxyl groups, thiol groups, primary and secondary amino groups, carbamate groups, allophanate groups, carboxyl groups, carboxylic anhydride groups, methylol groups, methylol ether groups, N-methylol groups, N-methylol ether groups, isocyanate groups, blocked isocyanate groups, urea groups, malonic diester groups, carbonate groups, and epoxide groups, especially epoxide groups.

The epoxide groups (E2) are preferably selected from the group consisting of oxiran-2-yl, 2,3-epoxy- and 3,4-epoxy-cyclopentyl, 2,3- and 3,4-epoxycyclohexyl, and 2,3-, 3,4- and 4,5-epoxycycloheptyl radicals, but especially oxiran-2-yl and 2,3- and 3,4-epoxycyclohexyl groups.

The groups L are preferably selected from the group consisting of divalent, substituted and unsubstituted, aliphatic, cycloaliphatic, aromatic, aliphatic-cycloaliphatic, aliphatic-aromatic, cycloaliphatic-aromatic and aliphatic-cycloaliphatic-aromatic radicals, and also heteroatom-containing aliphatic, aromatic, cycloaliphatic, aliphatic-cycloaliphatic, aliphatic-aromatic, cycloaliphatic-aromatic and aliphatic-cycloaliphatic-aromatic hydrocarbon radicals.

The groups L are preferably (1) substituted or unsubstituted, preferably unsubstituted, linear or branched, preferably linear, alkanediyl radicals of from 3 to 30, preferably from 3 to 20, and in particular 3 carbon atoms, which may also contain cyclic groups within the carbon chain, with particular preference trimethylene, tetramethylene, pentamethylene, hexamethylene, heptamethylene, octamethylene, nonane-1,9-diyl, decane-1,10-diyl, undecane-1,11-diyl, dodecane-1,12-diyl, tridecane-1,13-diyl, tetradecane-1,14-diyl, pentadecane-1,15-diyl, hexadecane-1,16-diyl, heptadecane-1,17-diyl, octadecane-1,18-diyl, nonadecane-1,19-diyl, eicosane-1,20-diyl, 2-heptyl-1-pentylcyclohexane-3,4-bis (non-9-yl), cyclohexane-1,2-, -1,4- or -1,3-bis(methyl), cyclohexane-1,2-, -1,4- or -1,3-bis(eth-2-yl), cyclohexane-1,3-bis(prop-3-yl) or cyclohexane-1,2-, -1,4- or -1,3-bis(but-4-yl), and especially tetramethylene, pentamethylene, hexamethylene, heptamethylene, octamethylene, nonane-1,9-diyl, and decane-1,10-diyl;

(2) substituted or unsubstituted, preferably unsubstituted, linear or branched, preferably linear, oxaalkanediyl radicals of from 3 to 30, preferably from 3 to 20, and in particular from 3 to 6 carbon atoms, which may also contain cyclic groups within the carbon chain, especially oxapropane-1,4-diyl, oxabutane-1,5-diyl, oxapentane-1, 5-diyl, oxahexane-1,7-diyl or 2-oxapentane-1,5-diyl;

(3) divalent polyester radicals with repeated polyester units of the formula —(—CO—(CHR$^7$)$_r$—CH$_2$—O—)—. The index r here is preferably from 4 to 6 and the substituent $R^7$=hydrogen or an alkyl, cycloalkyl or alkoxy radical. No one substituent contains more than 12 carbon atoms;

(4) linear polyether radicals, preferably having a number-average molecular weight of from 400 to 5 000, in particular from 400 to 3 000, which derive from poly(oxyethylene)glycols, poly(oxypropylene)glycols and poly(oxybutylene)glycols;

(5) linear siloxane radicals, as present for example in silicone rubbers; hydrogenated polybutadiene or polyisoprene radicals, random or alternating butadiene-isoprene copolymer radicals or butadiene-isoprene graft copolymer radicals, which may also contain styrene in copolymerized form, and also ethylene-propylene-diene radicals;

(6) phen-1,4-, -1,3- or -1,2-ylene, naphth-1,4-, -1,3-, -1,2-, -1,5- or -2,5-ylene, propane-2,2-di(phen-4'-yl), methane-di(phen-4'-yl), biphenyl-4,4'-diyl or 2,4- or 2,6-tolylene; or (7) cycloalkanediyl radicals of from 4 to 20 carbon atoms, such as cyclobutane-1,3-diyl, cyclopentane-1,3-diyl, cyclohexane-1,3- or 1,4-diyl, cycloheptane-1,4-diyl, norbomane-1,4-diyl, adamantane-1,5-diyl, decalindiyl, 3,3,5-trimethylcyclohexane-1,5-diyl, 1-methylcyclohexane-2,6-diyl, dicyclohexylmethane-4,4'-diyl, 1,1'-dicyclohexane-4,4'-diyl or 1,4-dicyclohexylhexane-4,4"-diyl, especially 3,3,5-trimethylcyclohexane-1,5-diyl or dicyclohexylmethane-4,4'-diyl.

Particular preference is given to using the linking groups L(1) and L(2), with very particular preference ethylene, trimethylene, tetramethylene, pentamethylene, hexamethylene, heptamethylene, octamethylene, oxapropane-1,4-diyl or 2-oxapentane-1,5-diyl, and especially trimethylene, oxapropane-1,4-diyl or 2-oxapentane-1,5-diyl, particularly ethylene, trimethylene, and 2-oxapentane-1,5-diyl groups.

The radicals $R^1$ are preferably selected from the group consisting of substituted and unsubstituted cyclopentyloxy, cyclohexyloxy, methoxy, ethoxy, propoxy, isopropoxy, butyloxy, phenoxy, methyl, ethyl, n-propyl, isopropyl, n-butyl, n-pentyl, n-hexyl, cyclopentyl, cyclohexyl, and phenyl radicals.

The radicals $R^2$ and $R^3$ are preferably selected from the group consisting of cyclopentyloxy, cyclohexyloxy, methoxy, ethoxy, propoxy, isopropoxy, butyloxy, and phenoxy radicals.

The silicon compounds (C) are preferably selected from the group consisting of (E1) (meth)acryloyloxyalkyltrialkoxysilane, (meth)acryloyloxyalkylalkyldialkoxysilane, (meth)acryloyloxyalkylcycloalkyldialkoxysilane, (meth)acryloyloxyalkylaryldialkoxysilane, (meth)acryloyloxycycloalkyltrialkoxysilane, (meth)acryloyloxycycloalkylalkyldialkoxysilane, (meth)acryloyloxycycloalkylcycloalkyldialkoxy-silane, (meth)acryloyloxycycloalkylphenyldialkoxy-silane, (meth)acryloyloxyphenyltrialkoxysilane, (meth)acryloyloxyphenylalkyldialkoxysilane, (meth)acryloyloxyphenylcycloalkyldialkoxy-silane, (meth)acryloyloxyphenylphenyldialkoxysilane, (E2a) glycidyloxyalkyltrialkoxysilane, glycidyloxyalkylalkyldialkoxysilane, glycidyloxyalkylcycloalkyldialkoxysilane, glycidyloxyalkylaryldialkoxysilane, glycidyloxycycloalkyltrialkoxysilane, glycidyloxycycloalkylalkyldialkoxysilane, glycidyloxycycloalkylcycloalkyldialkoxysilane, glycidyloxycycloalkylphenyldialkoxysilane, glycidyloxyphenyltrialkoxysilane, glycidyloxyphenylalkyldialkoxysilane, glycidyloxyphenylcycloalkyldialkoxysilane, and glycidyloxyphenylphenyldialkoxysilane, and also (E2b) 2,3- and 3,4-epoxycyclohexylalkyltrialkoxysilane, -alkylalkyldialkoxysilane, -alkylcycloalkyldialkoxysilane, -alkylaryldialkoxysilane, -cycloalkyltrialkoxysilane, -cycloalkylalkyldialkoxysilane, -cycloalkylcycloalkyldialkoxysilane, -cycloalkylaryldialkoxysilane, -aryltrialkoxysilane, -arylalkyldialkoxysilane, -arylcycloalkyldialkoxysilane, and -arylaryldialkoxysilane.

The silicon compounds (C) are customary and known compounds and are disclosed, for example, in the European patent EP 0 401 496 B1, page 3 lines 10 to 15, the American patent U.S. Pat. No. 5,100,955 A, column 1 line 36 to column 2 line 13, international patent application WO 99/52964, page 6 line 1 to page 8 line 20, the German patent application DE 197 26 829 A1, column 2 line 27 to column 3 line 38, the German patent application DE 199 10 876 A1, page 2 line 35 to page 3 line 12, the German patent application DE 38 28 098 A1, page 2 line 27 to page 4 line 43, or the European patent application EP 0 450 625 A1, page 2 line 57 to page 5 line 32.

Highly suitable silicon compounds (C) are also sold under the brand name WETLINK® by Compton Europe.

With particular preference, the silicon compounds (C) are selected from the group consisting of 3-methacryloyloxypropyltriisopropoxysilane, 3-glycidyl-oxypropylmethyldiethoxysilane, 3-glycidyloxypropyltrimethoxysilane, 3-glycidyloxypropyltriethoxysilane, 2-(3,4-epoxycyclohexyl)ethyltriethoxysilane and -ethyltrimethoxysilane, and 3-(3,4-epoxycyclohexyl)propyltriethoxysilane and -propyltrimethoxysilane.

The amount of the silicon compounds (C) in the coating material of the invention may vary widely and is guided by the requirements of the case in hand, in particular by the functionality of the binders (A) and the number of reactive functional groups on the surface of the pigments (B). The silicon compounds (C) are preferably used in an amount such that there are from 0.1 to 2 mol of silicon compound (C) per mole of binder (A) and from 0.1 to 2 mol of silicon compound (C) per mole of effect pigment (B). This is generally the case with an amount of the silicon compound (C), based in each case on the solids of the coating material of the invention, of from 1 to 30%, more preferably from 2 to 28%, with particular preference from 3 to 26%, with very particular preference from 4 to 24%, and in particular from 5 to 25% by weight.

In addition to the essential constituents (A), (B) and (C) described above, the coating material of the invention may comprise further constituents.

Examples of such constituents are pigments from the group of the color, filling, rheology control, scratchproofing, transparent or hiding, and anticorrosion pigments, such as metal powders, organic and inorganic, transparent or hiding fillers, or nanoparticles.

Examples of suitable inorganic color pigments are white pigments, such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details, refer to Römpp Lexikon Lacke und Druckfarben, Georg Thieme Verlag, 1998, pages 180 and 181, "iron blue pigments" to "black iron oxide", pages 451 to 453, "pigments" to "pigment volume concentration", page 563, "thioindigo pigments", page 567, "titanium dioxide pigments", pages 400 and 467, "naturally occurring pigments", page 459, "polycyclic pigments", page 52, "azomethine pigments", "azo pigments", and page 379, "metal complex pigments".

Examples of suitable metal powders are powders of metals and metal alloys such as aluminum, zinc, copper, bronze or brass.

An example of an anticorrosion pigment is zinc phosphate.

Examples of suitable organic and inorganic fillers are chalk, calcium sulfates, barium sulfate, silicates such as talc, mica or kaolin, silicas, oxides such as aluminum hydroxide or magnesium hydroxide or organic fillers such as polymer powders, especially those of polyamide or polyacrylonitrile. For further details, refer to Römpp Lexikon Lacke und Druckfarben, Georg Thieme Verlag, 1998, pages 250 ff., "fillers".

It is preferred to employ mica and talc if an intention is to improve the scratch resistance of the color and/or effect coats produced from the basecoat materials.

It is also of advantage to use mixtures of platelet-shaped inorganic fillers such as talc or mica and non-platelet-shaped inorganic fillers such as chalk, dolomite, calcium sulfates or barium sulfate, since by this means it is possible to adjust the viscosity and rheology very effectively.

Examples of suitable transparent fillers are those based on silica, alumina or zirconium oxide.

Suitable nanoparticles are selected from the group consisting of hydrophilic and hydrophobic, especially hydrophilic, nanoparticles based on silica, alumina, zinc oxide, zirconium oxide, and the polyacids and heteropolyacids of transition metals, preferably of molybdenum and tungsten, having a primary particle size <50 nm, more preferably from 5 to 50 nm, in particular from 10 to 30 nm. The hydrophilic nanoparticles preferably have no flatting effect. Particular preference is given to using silica-based nanoparticles.

Very particular preference is given to using hydrophilic pyrogenic silicas whose agglomerates and aggregates have a chainlike structure and which can be prepared by the flame hydrolysis of silicon tetrachloride in an oxyhydrogen flame. They are sold, for example, by Degussa under the brand name Aerosil®. Very particular preference is also given to using precipitated waterglasses, such as nanohectorites, which are sold, for example, by Süidchemie under the brand name Optigel® or by Laporte under the brand name Laponite®. The surface of the nanoparticles may be modified. For this purpose it is possible, for example, to use the silicon compounds (C) that are for use in accordance with the invention.

The coating material of the invention may further comprise rheological aids. Suitable rheological aids include, in particular, synthetic polymers containing ionic and/or associative groups. Examples thereof are polyvinyl alcohol, poly(meth)acrylamide, poly(meth)acrylic acid, polyvinylpyrrolidone, styrene-maleic anhydride or ethylene-maleic anhydride copolymers and derivatives thereof, or else hydrophobically modified ethoxylated urethanes or polyacrylates. Particular preference is given to using carboxyl-containing polyacrylate copolymers having an acid number of from 60 to 780 mg KOH/g, in particular from 200 to 500 mg KOH/g. The rheological aid is intended to give the coating material of the invention the desired viscosity, especially at the pH used. Accordingly, particular suitability is possessed by ionic acrylate dispersions, which form fiberlike gels and the pH value is prevailing in the coating system prior to curing and which, as a result, overlay or loosely bind the other constituents, so that a film like structure is obtained even before the coating material is baked or dried. It is particularly preferred to use polyacrylic acid dispersions, which may have been polymerized where appropriate with further comonomers.

The rheological aid is present in the coating material of the invention preferably in an amount of from 0.01 to 5.0% by weight, in particular from about 0.1 to 1% by weight, based on the solids content.

Examples of further suitable rheological aids are xanthan gum, diurea compounds, polyurethane thickeners, bentonite, waxes and wax copolymers, and, preferably, ionic phyllosilicates, and mixtures thereof.

Particularly preferred rheological aids comprise mixtures of the aforementioned synthetic polymers with ionic or associative groups, and the ionic phyllosilicates.

The coating materials of the invention may further comprise at least one mixture of at least one polysiloxane defoamer, at least one hydrophobic solid, and at least one polyglycol.

Examples of suitable polysiloxane defoamers are polyether-modified polysiloxanes, such as are described, for example, in Johan Bieleman, "Lack-additive", Wiley-VCH, Weinheim, N.Y., 1998, "4.2.5 formulating the active substances", pages 110 to 111.

Examples of suitable hydrophobic solids are hydrophobic silicas or urea derivatives, such as are described, for example, in Johan Bieleman, "Lackadditive", Wiley-VCH, Weinheim, N.Y., 1998, "4.2.4.1 defoamers", pages 107 to 109.

Examples of suitable polyglycols are commercially customary polyethylene glycols, polypropylene glycols or polyethylene-co-polypropylene glycols containing on average per molecule from 4 to 100 oxaalkanediyl groups.

The mixtures are products that are known per se and are sold, for example, by Byk Chemie under the brand name Byk® 028.

The coating material of the invention may further comprise customary and known crosslinking agents. As crosslinking agents it is possible in particular to use the crosslinkers known in the coatings field, such as melamine resins, blocked polyisocyanates and/or tris(alkoxycarbonylamino)triazines. Examples of these and further suitable crosslinking agents are described in the German patent application DE 199 24 170 A1, column 10 line 51 to column 12 line 69 or the German patent application DE 199 14 896 A1, column 11 line 6 to column 13 line 55.

Additionally, the coating material of the invention may comprise further customary and known additives, as are described, for example, in the German patent application DE 199 14 816 A1, column 14 line 26 to column 16 line 63.

Insofar as the coating materials of the invention are to be curable with actinic radiation, especially UV radiation, as well, they may further comprise customary and known constituents curable with actinic radiation, and photoinitiators. Examples of suitable constituents and photoinitiators are described in the German patent applications DE 199 08 013 A1, column 6 line 63 to column 9 line 21, and DE 198 18 735 A1, column 3 line 16 to column 7 line 35.

The coating materials of the invention generally have a solids content of preferably from 10 to 70% by weight. The solids content varies with the intended use of the coating materials of the invention. For metallic aqueous basecoat materials, for example, it is preferably from 12 to 40% by weight. For solid-color topcoat materials it is higher, for example preferably from 25 to 60% by weight.

The preparation of the coating material of the invention has no special features in terms of its method but instead takes place by the mixing of the above-described constituents. This can be done using mixing equipment such as stirred vessels, dissolvers, inline dissolvers, stirred mills, static mixers, toothed-ring dispersers or extruders. Where appropriate, mixing is carried out in the absence of actinic radiation in order to prevent damage to the coating material of the invention that is additionally curable with actinic radiation.

The coating materials of the invention are preferably applied to a substrate surface which has been coated with a customary primer-surfacer or, where appropriate, to a substrate surface which has already been coated with a first, preferably aqueous, basecoat material, such as a low-build primer-surfacer. As primer-surfacers it is possible to use any prior art primer-surfacer which exhibits good physical drying (cf. U.S. Pat. No. 4,537,926 A1, EP 0 529 335 A1, EP 0 595 186 A1, EP 0 639 660 A1, DE 44 38 504 A1, DE 43 37 961 A1, WO 89/10387, U.S. Pat. No. 4,450,200 A1, U.S. Pat. No. 4,614,683 A1 or WO 94/26827). As aqueous low-build primer-surfacers it is preferred to use the coating materials described in DE 44 38 504 A1. In general, the primer-surfacer film, or the first basecoat film used instead of the primer-surfacer film, is allowed to evaporate for a short time before the coating materials of the invention are applied.

The suitable substrates include all surfaces to be coated that are undamaged by curing of the coatings present thereon using heat or heat and actinic radiation. Suitable substrates consist for example of metals, plastics, wood, ceramic, stone, textile, fiber composites, leather, glass, glass fibers, glass wool and rock wool, mineral- and resin-bound building materials, such as plasterboard panels and cement slabs or roof tiles, and composites of these materials. The surfaces of these materials may already have been painted or coated beforehand.

Following the application of the primer-surfacer or of the first basecoat material, the coating material of the invention or the aqueous basecoat material is applied in a manner known per se, by spraying, brushing, dipping, flow coating, knife coating or rolling, for example, to the substrate, such as metal, plastic, wood or glass, for example.

The aqueous basecoat film of the invention, applied to the substrate, is generally overcoated with a suitable transparent topcoat or with a clearcoat material. Prior to the application of the clearcoat material, the aqueous basecoat film is advantageously left to evaporate for a short time, preferably from 1 to 15 minutes, in particular from 4 to 8 minutes, at a temperature of from 60 to 100° C. The evaporation period depends on the temperature and can be adjusted over wide ranges.

Suitable clearcoat materials for producing the clearcoats include all customary and known one-component(1K), two-component(2K) or multicomponent(3K, 4K) clearcoat materials, powder clearcoat materials, powder slurry clearcoat materials and UV-curable clearcoat materials.

Thermally curable one-component(1K), two-component (2K) or multicomponent(3K, 4K) clearcoat materials are known from the patent applications DE 42 04 518 A1, EP 0 594 068 A1, EP 0 594 071 A1, EP 0 594 142 A1, EP 0 604 992 A1, and EP 0 596 460 A1, from the international patent applications WO 94/10211, WO 94/10212, WO 94/10213, WO 94/22969, and WO 92/22615, or from the American patents U.S. Pat. No. 5,474,811 A, U.S. Pat. No. 5,356,669 A, and U.S. Pat. No. 5,605,965 A.

One-component(1K) clearcoat materials comprise, as is known, hydroxyl-containing binders and crosslinking agents such as blocked polyisocyanates, tris(alkoxycarbonylamino) triazines and/or amino resins. In another variant they comprise, as binders, polymers containing pendent carbamate and/or allophanate groups, and carbamate- and/or allophanate-modified amino resins as crosslinking agents (cf. the American patents U.S. Pat. No. 5,474,811 A, U.S. Pat. No. 5,356,669 A, and U.S. Pat. No. 5,605,965 A1, the international patent applications WO 94/10211, WO 94/10212, and WO 94/10213 or the European patent applications EP 0 594 068 A1, EP 0 594 071 A1, and EP 0 594 142 A1).

Two-component(2K) or multicomponent(3K, 4K) clearcoat materials comprise essential constituents which, as is known, comprise hydroxyl-containing binders and polyisocyanate crosslinking agents, which are stored separately up until the time of their use.

Thermally curable powder clearcoat materials are known, for example, from the German patent application DE 42 22 194 A1, from the BASF Lacke+Farben AG product information "Pulverlacke" [Powder coating materials], 1990 or from the BASF Coatings AG brochure "Pulverlacke, Pulverlacke für industrielle Anwendungen" [Powder coating materials, powder coatings for industrial applications], January 2000.

Essential constituents of powder clearcoat materials are known to comprise epoxy-functional binders and polycarboxylic acid crosslinking agents.

Examples of suitable powder slurry clearcoat materials are known from the U.S. patent U.S. Pat. No. 4,268,542 A1 and from the patent applications DE 195 40 977 A1, DE 195 18 392 A1, DE 196 17 086 A1, DE 196 13 547 A1, EP 0 652 264 A1, DE 196 18 657 A1, DE 196 52 813 A1, DE 196 17 086 A1, and DE 198 14 471 A1.

Powder slurry clearcoat materials comprise, as is known, powder clearcoat materials dispersed in an aqueous medium.

Clearcoat materials, powder clearcoat materials, and powder slurry clearcoat materials that are curable with actinic radiation are disclosed, for example, in the European patent applications EP 0 928 800 A1, EP 0 636 669 A1, EP 0 410 242 A1, EP 0783 534 A1, EP 0 650978 A1, EP 0650979 A1, EP 0650985 A1, EP 0 540 884 A1, EP 0 568 967 A1, EP 0 054 505 A1, and EP 0 002 866 A1, the German patent applications DE 198 35 206 A1, DE 197 09 467 A1, DE 42 03 278 A1, DE 33 16 593 A1, DE 38 36 370 A1, DE 24 36 186 A1, and DE 20 03 579 B1, the international patent applications WO 97/46549 and WO 99/14254 or the American patents U.S. Pat. No. 5,824,373 A, U.S. Pat. No. 4,675,234 A, U.S. Pat. No. 4,634,602 A, U.S. Pat. No. 4,424,252 A, U.S. Pat. No. 4,208,313 A, U.S. Pat. No. 4,163,810 A, U.S. Pat. No. 4,129,488 A, U.S. Pat. No. 4,064,161 A, and U.S. Pat. No. 3,974,303 A.

Clearcoat materials, powder clearcoat materials, and powder slurry clearcoat materials curable thermally and with actinic radiation are disclosed, for example, in the patent applications DE 198 18 735 A1, WO 98/40170, DE 199 08 013 A1, DE 199 08 018 A1, EP0 844 286 A1, and EP 0 928 800 A1.

In general, the clearcoat materials are applied in a wet film thickness such that curing thereof results in clearcoats having the film thicknesses necessary and advantageous for their functions. These thicknesses are preferably from 10 to 100 μm, more preferably from 15 to 80 μm, with particular preference from 20 to 75 μm, and in particular from 25 to 70 μm.

Following their application, the aqueous color and/or effect basecoat films are cured thermally, or thermally and with actinic radiation, together with the clearcoat films and, where appropriate, with the primer-surfacer films.

Curing may take place after a certain rest period or flashoff period. This period may have a duration of from 30 s to 2 h, preferably from 1 min to 1 h, and in particular from 1 min to 45 min. The rest period is used, for example, for the leveling and devolatilization of the films and for the evaporation of volatile constituents such as any solvent and/or water still present.

Actinic radiation curing is preferably carried out using a dose of from 1 000 to 2 000, more preferably from 1 100 to 1 900, with particular preference from 1 200 to 1 800, with very particular preference from 1 300 to 1 700, and in particular from 1 400 to 1 600 mJ/cm$^2$. If desired, this curing may be supplemented by actinic radiation from other radiation sources. In the case of electron beams it is preferred to operate under an inert gas atmosphere. This can be ensured, for example, by supplying carbon dioxide and/or nitrogen directly to the surface of the clearcoat film. In the case of curing with UV radiation as well it is possible to operate under inert gas, in order to prevent the formation of ozone.

Curing with actinic radiation is carried out using the customary and known radiation sources and optical auxiliary measures. Examples of suitable radiation sources are flash lamps from the company VISIT, high-pressure or low-pressure mercury vapor lamps, with or without lead doping in order to open up a radiation window of up to 405 nm, and electron beam sources.

Thermal curing also has no special features as far as its method is concerned, but instead takes place in accordance with the customary and known methods such as heating in a forced air oven in countercurrent or irradiation using IR and/or NIR lamps. Thermal curing is advantageously effected at temperatures of from 90° C. to 180° C.

Further examples of suitable curing methods are known from the German patent application DE 98 18 735 A1, column 10 line 31 to column 11 line 33.

The coating materials of the invention, or aqueous basecoat materials, are outstandingly suitable for producing decorative, functional and effect and/or protective, single-coat and multicoat paint systems on motor vehicle bodies and parts thereof, the interior and exterior of motor vehicles, buildings inside and out, doors, windows, furniture and hollow glassware, and also in the context of the industrial coating of small parts, coils, containers, packaging, electric components, and white goods.

In the context of the repair of one-coat and multicoat color and/or effect paint systems, it is possible to apply the coating materials of the invention to the surfaces that are to be repaired, without special pretreatment and/or auxiliaries.

The one-coat and multicoat effect paint systems of the invention are of the highest optical quality as regards color, effect, gloss, and DOI (distinctness of the reflected image), have a smooth, textureless, hard, flexible, and scratch-resistant surface, are stable to weathering, resistant to chemicals and resistant to etching, do not yellow, and display no film delamination or cracking nor damage to the effect pigments.

Accordingly, the substrates of the invention as well, especially bodies of automobiles and commercial vehicles, buildings inside and out, industrial components, including parts made of plastic, small parts, packaging, coils, white goods and electrical components, or furniture, doors, windows or hollow glassware that are coated with at least one coating of the invention have particular technical and economic advantages, in particular a long service life, which makes them particularly attractive for the users.

INVENTIVE AND COMPARATIVE EXAMPLES

The Preparation of an Inventive Aqueous Basecoat Material and of an Inventive Multicoat Effect Paint System (Inventive Example) and the Preparation of a Noninventive Aqueous Basecoat Material and of a Noninventive Multicoat Paint System (Comparative Example)

For the inventive example, 8.3 parts by weight of butyl glycol, 5.9 parts by weight of aluminum effect pigment, 4.0 parts by weight of 3-glycidyloxypropyl-trimethoxysilane (Wetlink® 78 from Compton Europe), 1.0 part by weight of a melamine resin (Cymel® 1133) and 0.3 part by weight of a commercial wetting agent solution were charged to a suitable stirring vessel and homogenized.

2.3 parts by weight of aqueous acrylate dispersion Acronal® 290D (from BASF AG) and 20.2 parts by weight of aqueous polyurethane resin dispersion from Example 1 of DE 43 39 870 A1 were added with stirring to the resulting mixture. That mixture was then admixed with 0.2 part by weight of titanium dioxide pigment (Titan Rutil® 2310) and carbon black pigment (Russ Monarch® 1400).

The homogenized mixture was then further admixed in the stated sequence with 1.0 part by weight of butyl glycol, 0.25 part by weight of 15 percent strength ammonia solution, 13.1 parts by weight of Laponite® (three percent solution of a filo silicate in water, with additional 3% by weight of Pluriol® P 600 from BASF AG), 17.8 parts by weight of deionized water, 17.8 parts by weight of Viscalex® HV30 from Allied Colloids (rheological aid) and 6.75 parts by weight of deionized water. The resulting mixture was homogenized to give the inventive aqueous basecoat material.

For the Comparative Example, the Inventive Example was repeated but using 5.0 parts by weight of Cymel® 1133 instead of 4.0 parts by weight of Wetlink® 78 and 1.0 part by weight of Cymel® 1133.

The inventive coating material was stable on storage. When, in contrast, the noninventive coating material was stored for a relatively long time, there was damage to the aluminum effect pigments, and hydrogen was given off.

For producing the multicoat paint systems, first of all a primer-surfacer was prepared in the following manner:

30.9 g of a binder (31% solids content) prepared as per Example 1 of DE 44 38 504 A1 were admixed in succession and with vigorous stirring with 0.5 g of Additol® XW395 (Hoechst AG), 1.8 g of a 50% strength solution of tetramethyldecynol in butyl glycol, 0.2 g of Aerosil® R805 (Degussa AG), 0.02 g of pigment black (FW2 from Degussa AG), 0.3 g of titanium rutile R900 (DuPont), 3.45 g of Heliogen Green L8730 (BASF AG), 0.35 g of Bayferox (Bayer AG), 2.95 g of Hostaperm Yellow H3G (Hoechst AG), 4.0 g of talc 10 MO (Luzenac), 3.1 g of Blanc Fixe powder F (Sachtleben) and 7.5 g of deionized water. The resulting mixture was treated in a dissolver at a maximum temperature of 40° C. for 20 minutes and then ground in a stirred mill to a fineness of from 10 to 15 µm (Hegemann wedge 25). 54.77 g of the millbase produced in this way were admixed with vigorous stirring with 30.9 g of the binder (31% solids content) prepared as per Example 1 of DE 44 38 504 A1, 2.8 g of butyl glycol, 0.45 g of Byk® 346 (Byk-Gulden), 0.9 g of Byketol WS (Byk-Gulden), 1.5 g of Shellsol® T (Shell), 4 g of deionized water and 4.5 g of a 10% strength aqueous dimethylethanolamine solution. For application, the low-build primer-surfacer was adjusted with deionized water to a viscosity of 30 seconds in the DIN4 flow cup.

The low-build primer-surfacer was applied to metal bodywork panels coated with a commercially customary electrocoat material and was flashed off at 20° C. for 5 minutes and held in a forced air oven at 80° C. for 5 minutes, so that the dried low-build primer-surfacers had a dry film thickness of approximately 15 µm. After cooling to 20° C., the bodywork panels coated in this way were coated with the aqueous basecoat materials of the inventive and comparative examples. The aqueous basecoat films were flashed off at 20° C. for 5 minutes and held in a forced air oven at 80° C. for 5.5 minutes, giving dried aqueous basecoats with a dry film thickness of approximately 15 µm.

This system was overcoated with a powder slurry clearcoat material as per the example of WO 96/32452. The resultant powder clearcoat films were flashed off at 20° C. for 5 minutes and subjected to initial drying in a forced air oven at a panel temperature of 50° C. for 5 minutes. Finally, the aqueous basecoat films and the clearcoat films were baked at 150° C. for 30 minutes. The dry film thickness of the clearcoats was approximately 40 µm.

With both the inventive and the noninventive multicoat paint system, no cracking was observed. In the noninventive multicoat paint system, however, there were bubbles originating from the partial breakdown of the aluminum effect pigments. These bubbles were not present in the inventive multicoat paint system.

The multicoat paint system of the invention had outstanding optical properties (appearance). It was highly elastic, of high stonechip resistance and mechanical strength, and of particularly high gasing stability. It had an outstanding intercoat adhesion, very good wet adhesion properties, and a very low moisture sensitivity, so that no water spots occurred either.

What is claimed is:

1. An aqueous effect coating material comprising
   (A) at least one water-soluble, -dilutable and/or -dispersible binder,
   (B) at least one effect pigment selected from the group consisting of optical effect pigments, electrically conductive pigments, magnetically shielding pigments, fluorescent pigments, and combinations thereof, and
   (C) at least one silicon compound of the general formula

 (I)

wherein
   n is an integer from 1 to 5;
   E is a reactive functional group;
   L is an at least divalent, linking, organic group;
   $R^1$ is a substituted radical or an unsubstituted radical, and wherein the radical is at least one of a cycloalkoxy radical, an alkoxy radical, an aryloxy radical, a cycloalkyl radical an alkyl radical, and/or an aryl radical; and
   $R^2$ and $R^3$ independently of one another are a hydroxyl group, a substituted radical, or an unsubstituted radical, and wherein the radical is at least one of a cycloalkoxy radical, an alkoxy radical, and/or an aryloxy radical, wherein the at least one silicon compound (C) stabilizes the at least one effect pigment (B).

2. The coating material of claim 1, wherein n=1.

3. The coating material of claim 1, wherein the group E is selected from the group consisting of
   (E1) reactive functional groups having at least one bond which can be activated with actinic radiation, and
   (E2) reactive functional groups which are able to undergo thermally initiated reactions with themselves or with corresponding reactive functional groups.

4. The coating material of claim 3, wherein the bonds which can be activated with actinic radiation are at least one of carbon-hydrogen single bonds, carbon-carbon single bonds, carbon-oxygen single bonds, carbon-nitrogen single bonds, carbon-phosphorus single bonds, carbon-silicon single bonds, carbon-carbon double bonds, carbon-oxygen double bonds, carbon-nitrogen double bonds, carbon-phosphorus double bonds, and/or carbon-silicon double bonds.

5. The coating material of claim 4, wherein the bonds which can be activated with actinic radiation are carbon-carbon double bonds.

6. The coating material of claim 5, wherein the groups (E1) containing double bonds are selected from the group consisting of (meth)acrylate groups, ethacrylate groups, crotonate groups, cinnamate groups, vinyl ether groups, vinyl ester groups, dicyclopentadienyl groups, norbornenyl groups, isoprenyl groups, isopropenyl groups, allyl groups, butenyl groups, dicyclopentadienyl ether groups, norbornenyl ether groups, isoprenyl ether groups, isopropenyl ether groups, allyl ether groups, butenyl ether groups, dicyclopentadienyl ester groups, norbornenyl ester groups, isoprenyl ester groups, isopropenyl ester groups, allyl ester groups, butenyl ester groups, and combinations thereof.

7. The coating material of claim 3, wherein the reactive functional groups (E2) are selected from the group consisting of hydroxyl groups, thiol groups, primary amino groups, secondary amino groups, carbamate groups, allophanate groups, carboxyl groups, carboxylic anhydride groups, methylol groups, methylol ether groups, N-methylol groups, N-methylol ether groups, isocyanate groups, blocked isocyanate groups, urea groups, malonic diester groups, carbonate groups, epoxide groups, and combinations thereof.

8. The coating material of claim 7, wherein the epoxide groups (E2) are selected from the group consisting of oxiran-2-y radicals, 2,3-epoxy-cyclopentyl radicals, 3,4-epoxycyclopentyl radicals, 2,3-epoxycyclohexyl radicals, 3,4-epoxycyclohexyl radicals, 2,3-epoxycycloheptyl radicals, 3,4-epoxycycloheptyl radicals, 4,5-epoxycycloheptyl radicals, and combinations thereof.

9. The coating material of claim 1, wherein the linking, organic group L is divalent.

10. The coating material of claim 9, wherein the group L is a hydrocarbon radical selected from the group consisting of aliphatic radicals, cycloaliphatic radicals, aromatic radicals, aliphatic-cycloaliphatic radicals, aliphatic-aromatic radicals, cycloaliphatic-aromatic radicals, aliphatic-cycloaliphatic-aromatic radicals, and combinations thereof, wherein the hydrocarbon radical is substituted or unsubstituted, and optionally, wherein the hydrocarbon radical contains a heteroatom.

11. The coating material of claim 10, wherein the group L is selected from the group consisting of ethylene groups, trimethylene groups, 2-oxapentane-1,5-diyl groups, and combinations thereof.

12. The coating material of claim 1, wherein the radical $R^1$ is substituted or unsubstituted and is selected from the group consisting of cyclopentyloxy radicals, cyclohexyloxy radicals, methoxy radicals, ethoxy radicals, propoxy radicals, isopropoxy radicals, butyloxy radicals, phenoxy radicals, methyl radicals, ethyl radicals, n-propyl radicals, isopropyl radicals, n-butyl radicals, n-pentyl radicals, n-hexyl radicals, cyclopentyl radicals, cyclohexyl radicals, phenyl radicals, and combinations thereof.

13. The coating material of claim 1, wherein the radicals $R^2$ and $R^3$ are selected from the group consisting of cyclopentyloxy radicals, cyclohexyloxy radicals, methoxy radicals, ethoxy radicals, propoxy radicals, isopropoxy radicals, butyloxy radicals, phenoxy radicals, and combinations thereof.

14. The coating material of claim 1, wherein the at least one silicon compound (C) is selected from the group consisting of (meth)acryloyloxyalkyltrialkoxysilane, (meth)acryloyloxyalkylalkyldialkoxysilane, (meth)acryloyloxyalkylcycloalkyldialkoxy-silane, (meth)acryloyloxyalkylaryldialkoxysilane, (meth) acryloyloxycycloalkyltrialkoxysilane, (meth) acryloyloxycycloalkylalkyldialkoxysilane, (meth) acryloyloxycycloalkylcycloalkyldialkoxy-silane, (meth)acryloyloxycycloalkylphenyldialkoxy-silane, (meth)acryloyloxyphenyltrialkoxysilane, (meth)acryloyloxyphenylalkyldialkoxysilane, (meth)acryloyloxyphenylcycloalkyldialkoxy-silane, (meth)acryloyloxyphenylphenyldialkoxysilane,
glycidyloxyalkyltrialkoxysilane, glycidyloxyalkylalkyldialkoxysilane, glycidyloxyalkylcycloalkyldialkoxysilane; glycidyloxyalkylaryldialkoxysilane, glycidyloxycycloalkyltrialkoxysilane, glycidyloxycycloalkylalkyldialkoxysilane, glycidyloxycycloalkylcyclo-alkyldialkoxysilane, glycidyloxycycloalkylphenyldialkoxysilane, glycidyloxyphenyltrialkoxysilane, glycidyloxyphenylalkyldialkoxysilane, giycidyloxyphenylcycloalkvldialkoxysilane, glycidyloxyphenylphenyldialkoxysilane, 2,3-and 3,4-epoxycyclohexylalkyltrialkoxysilane, 2,3-alkylalkyldialkoxysilane, 2,3-alkylcycloalkyldialkoxysilane, 2,3-alkylaryldialkoxysilane, 2,3-cycloalkyltrialkoxysilane, 2,3-cycloalkylalkyldialkoxysilane, 2,3-cycloalkylcycloalkyldialkoxysilane- , 2,3-cycloalkylaryldialkoxysilane, 2,3-aryltrialkoxysilane, 2,3-arylalkyldialkoxysilane, 2,3-arylcycloalkyldialkoxysilane, and 2,3-arylaryldialkoxysilane, 3,4-epoxycycloalkyltrialkoxysilane, 3,4-alkylalkyldialkoxysilane, 3,4-alkylcycloalkytrialkoxysilane, 3,4-alkylaryldialkoxysilane 3,4-cycloalkyltrialkoxysilane, 3,4-cycloalkylalkyldialkoxysilane, 3,4-cycloalkylcycloalkyldialkoxysilane-, 3,4-cycloalkylaryldialkoxysilane 3,4-aryltrialkoxysilane, 3,4-arylalkyldialkoxysilane, 3,4-arylcycloalkyldialkoxysilane, 3,4-arylaryldialkoxysilane,
and combinations thereof.

15. The coating material of claim 1, wherein the at least one silicon compounds (C) is selected from the group consisting of 3-methacryloyloxypropyltriisopropoxysilane, 3-glycidyloxy-propylmethyldiethoxysilane, 3-glycidyloxypropyltrimethoxysilane, 3-glycidyloxypropyltriethoxysilane, -2-(3,4-epoxycyclohexyl)ethyltriethoxysilane, 2-(3,4-epoxycyclohexyl) ethyltrimethoxysilane, 3-(3, 4-epoxycyclohexyl)-propyltriethoxysilane, -3-(3,4-epoxycyclohexyl)propyltrimethoxysilane,
and combinations thereof.

16. The coating material of claim 1, wherein the at least one binder (A) is selected from the group consisting of addition (co)polymers of ethylenically unsaturated monomers, polyaddition resins, polycondensation resins, and combinations thereof, and the binders are curable by one of physically, thermally, with actinic radiation, or thermally and with actinic radiation, wherein the addition (co)polymer is ionically stabilized, or inonically and nonionically stabilized, and the addition (co)polymer is at least one of random, alternating, block, linear, branched, and/or comb.

17. The coating material of claim 16, wherein the at least one binders (A) is selected from the group consisting of (meth)acrylate (co)polymers, partially hydrolyzed polyvinyl esters, polyesters, alkyds, polylactones, polycarbonates, polyethers, epoxy resin-amine adducts, polyureas, polyamides, polyimides, polyurethanes, and combinations thereof.

18. The coating material of claim 17, wherein the at least one binders (A) is selected from the group consisting of (meth)acrylate copolymers, polyurethanes, and combinations thereof.

19. The coating material of claim 18, wherein the at least one binders (A) is one of anionically stabilized or anionically and nonionically stabilized.

20. The coating material of claim 19, wherein the at least one binders (A) is selected from the group consisting of (A1) (meth)acrylate copolymers containing in copolymerized form from 30 to 60% by weight of $C_1$–$C_8$ alkyl (meth)acrylates, from 30 to 60% by weight of vinylaromatic monomers, and from 0.5 to 10% by weight of (meth)acrylic acid, based in each case on the (meth)acrylate copolymer, (A2) polyurethanes prepared by subjecting at least one ethylenically unsaturated monomer to free-radical polymerization in an aqueous dispersion of a polyurethane resin having a number-average molecular weight Mn of from 1 000 to 30 000 daltons and containing on average per molecule from 0.05 to 1.1 polymerizable double bonds in the presence of at least one water-insoluble initiator, a weight ratio between the polyurethane resin and the at least one ethylenically unsaturated monomer being between 1:10 and 10:1, and combinations thereof.

21. The coating material of claim 1, further comprising pigments selected from the group consisting of organic pigments, inorganic pigments, and colored pigments.

22. A process for preparing the coating material of claim 1 comprising mixing and homogenizing the constituents (A), (B), and (C), which comprises (1) dispersing at least one effect pigment (B) together with at least one silicon compound (C) and then (2) adding an aqueous dispersion of the at least one binder (A), and (3) homogenizing the resulting mixture.

23. The process of claim 22, wherein (B) and (C) are dispersed in at least one organic solvent.

24. A method comprising applying the coating material of claim 1 to a substrate and forming an at least one-coat effect paint systems.

25. The method of claim 24, wherein the substrate is one of a motor vehicle body, a motor vehicle part, a building, a door, a window, furniture, hollow glassware, a part, a coil, a container, a packaging, an electrical component, or a white good.

* * * * *